March 14, 1967     I. BROWN     3,309,510

ANALOG MULTIPLIER

Filed July 12, 1963     2 Sheets-Sheet 1

IRVING BROWN,
INVENTOR.

BY Harry M. Saragovitz
Edward J. Kelly
Herbert Berl
Alfred E. Smith

IRVING BROWN,
INVENTOR.

3,309,510
ANALOG MULTIPLIER

Irving Brown, Cherry Hill, N.J., assignor, by mesne assignments, to the United States of America as represented by the Secretary of the Army
Filed July 12, 1963, Ser. No. 294,776
4 Claims. (Cl. 235—194)

This invention relates generally to analog multipliers and more particularly to a means for rapidly and accurately multiplying two or more analog voltages in analog computers.

Ordinary servomechanism type multipliers are restricted to use with low frequency components and impose limitations on the computer time scale and on the speed of computation. The all-electronic multiplier according to this invention affords a means of rapidly and accurately multiplying two or more analog voltages which may be varying at a rate higher than that which ordinary servomechanism type multipliers can handle. Its principle is based on the fact that the average value of a series of pulses is proportional to the product of pulse height times the duration of the pulse.

A repetitively occurring electrical pulse existing for a time $t$, repeating at a rate of $1/T$ cycles per second, and having a magnitude $e_1$ has an average value equal to $e_1 t/T$. This average value is readily achieved by passing the pulses through a low pass filter with cut-off frequency chosen well below the value $1/T$. The D.C. output of the filter is the desired result. In the present invention the time $t$ is made proportional to a voltage $e_2$; that is, $t = Ke_2$, K being a constant. The average voltage can now be stated as $$e_{avg.} = \frac{Ke_1 e_2}{T}$$

If the time period T is held constant, as may be done by any one of a number of well-known precise timing methods, then the filter output is directly proportional to the product of $e_1$ and $e_2$.

Accordingly, it is an object of the present invention to provide an all-electronic voltage multiplier.

It is a further object of the present invention to provide an analog multiplier capable of multiplying two or more analog voltages which may be varying at a high rate.

A still further object of the present invention is to provide an analog multiplier which can be used in high speed analog computers.

These and other objects and advantages of the present invention will become apparent from the following description considered in connection with the accompanying drawings, in which like characters refer to like parts, and in which.

Figure 1:
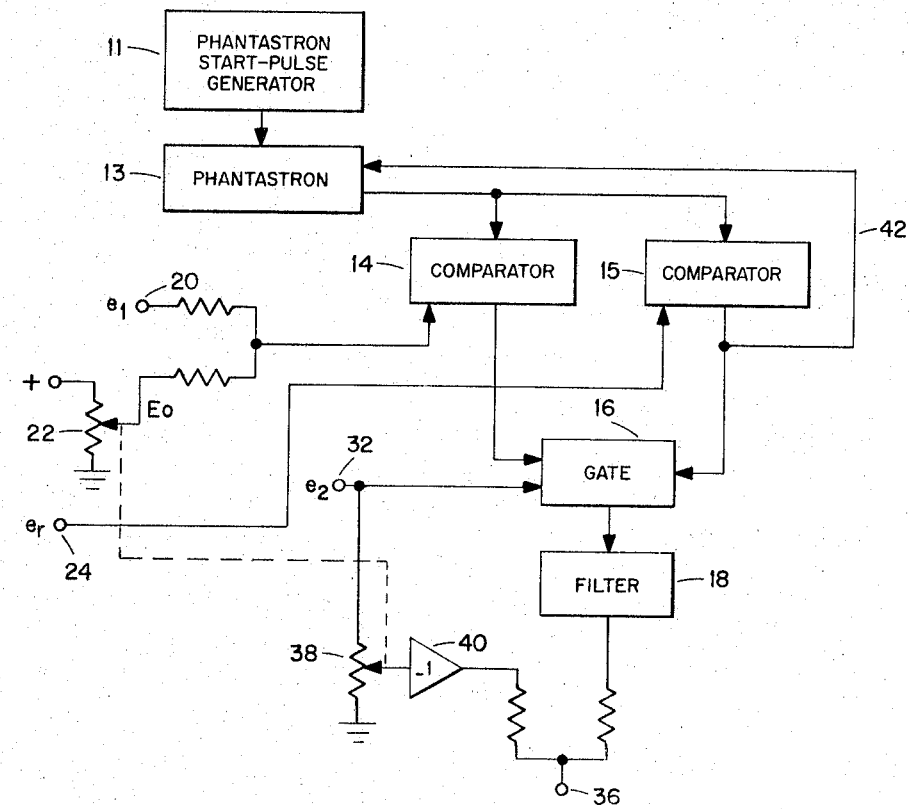
FIGURE 1 is a block diagram of an analog multiplier according to the invention.

The novel analog multiplier according to the present invention comprises a start-pulse generator 11, phantastron circuit 13, pick-off comparators 14 and 15, gate circuit 16 and a low pass filter 18.

Figure 2A:
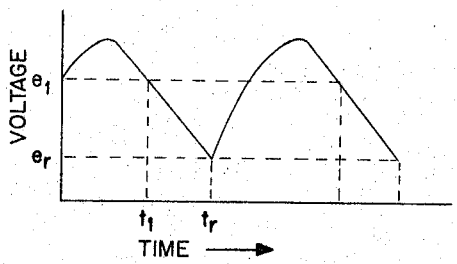
FIGURES 2a, 2b and 2c illustrate waveforms of signals applied to and derived from the circuit of FIGURE 1.
Figure 2C:
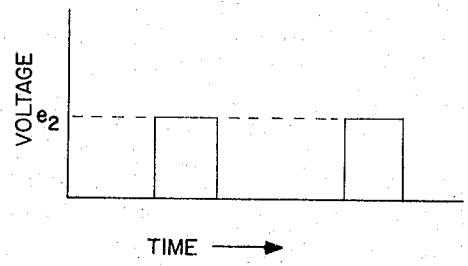

Phantastron 13 is coupled to comparators 14 and 15, which may be multiar circuits. The output of the phantastron, conventionally called the "run-down" and illustrated in FIGURE 2a, provides one of the input signals for each of the comparators.

Comparator 14 has its other input connected to an analog voltage source 20 which provides a voltage $e_1$ to be multiplied. Added to this voltage is a positive offset voltage $E_o$ taken from potentiometer 22 and equal to the center of the run-down voltage so that the sum $e_1 + E_o$ is never negative. When the input voltage to comparator 14 equals the run-down voltage, a pulse 22 appears at the output of the comparator. Comparator 15 has a second input connected to a reference voltage source 24 which causes a pulse 23 to appear at the output of comparator 15 when the reference voltage $e_r$, equals the run-down voltage. Gate circuit 16 is connected to the comparator output terminals for controlling the passage of a second analog voltage $e_2$ from source 32. The output of gate 16 is connected to the input side of low pass filter 18 and output terminal 36 is connected to the filter output.

A potentiometer 38 and an amplifier 40 are connected between source 32 and the filter output for subtracting the offset voltage from the output signal. Potentiometer 38 is mechanically connected to potentiometer 22 for simultaneous operation therewith.

Figure 2B:
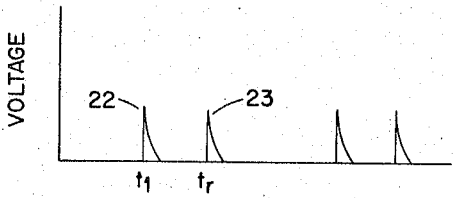

Considering now the operation of the hereinabove described multipler, the run-down voltage generated by phantastron 13 is fed as one input to comparator 14 whose other input is analog voltage $e_1$. Consequently, at the instant the run-down voltage equals $e_1$ a sharp pulse 22 is generated, as shown in FIGURE 2b, at time $t_1$.

At some later time $t_r$ the run-down voltage equals reference voltage $e_r$ in comparator 15 and generates a second sharp pulse 23. Since the reference voltage is a constant, the time spread between $t_r$ and $t_1$ is seen to vary linearly with $e_1$. The phantastron run-down is caused to terminate at $t_r$ by feeding pulse 23 back to the phantastron via line 42. The reason for terminating the run-down at $t_r$ instead of allowing the phantastron to terminate at its own "bottoming" voltage is to make the device independent of variations between tubes. The pulses 22 and 23 derived at times $t_1$ and $t_r$ are used, respectively, to open and close gate 16. It is seen then that $e_2$ appears at the output of gate 16 between times $t_1$ and $t_r$.

The signal appearing at the filter output is:

$$e_{avg.} = \frac{K(e_1 + E_o)}{T} e_2 = \frac{Ke_1 e_2}{T} + \frac{KE_o e_2}{T}$$

Since K, $E_o$ and T are constants, they constitute a constant multiplier and, accordingly, the term $KE_o e_2/T$ can be subtracted at the end of the computation leaving only $Ke_1 e_2/T$ in the output. This is accomplished with potentiometer 38 and amplifier 40.

Figure 3:
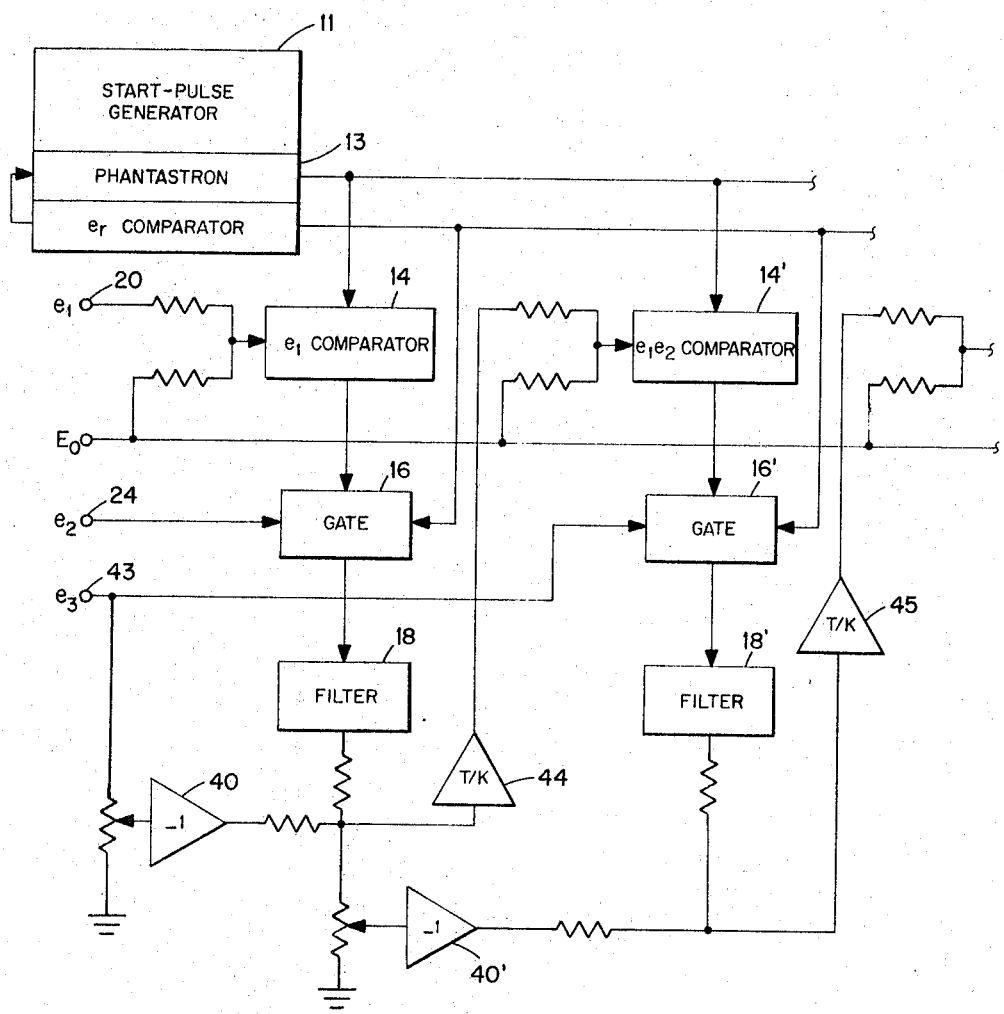
FIGURE 3 illustrates an adaptation of the invention for multiplying three or more signals.

The invention can be extended to include multiplication of three or more analog voltages. An important feature is that some equipment need not be repeated. The phantastron start-pulse generator 11, phantastron 13, and reference voltage comparator 15 are used only once regardless of how many factors are to be multiplied. This adaptation of the invention is shown in FIGURE 3 wherein comparator 14', gate 16', analog voltage source 43, filter 18' and amplifier 40' have been added to the basic circuit of FIGURE 1.

Further, to maintain a reasonable output scale factor the device includes amplifiers 44 and 45 having a fixed gain $T/K$. Without these amplifiers, the output would be:

$$e_{avg.} = \left(\frac{K}{T}\right)^n (e_1 e_2 e_3 \ldots e_n)$$

where $n$ is the number of voltages to be multiplied. Using the amplifiers results in:

$$e_{avg.} = \left(\frac{K}{T}\right)(e_1 e_2 e_3 \ldots e_n)$$

Obviously many modifications and variations of the present invention are possible in light of the above teach-

I claim:
1. An analog voltage multiplier comprising in combination:
   (a) means for generating a run-down voltage,
   (b) a first voltage comparator connected to said generating means,
   (c) a first analog voltage source connected to said comparator for generating a pulse at the output of said comparator when said annalog voltage equals said run-down voltage,
   (d) a second voltage comparator connected to said generating means,
   (e) a reference voltage source connected to said second comparator for generating a pulse at the output of said second comparator when said reference voltage equals said run-down voltage,
   (f) gate means connected to said first and second comparators,
   (g) a second analog voltage source connected to said gate means, and
   (h) a filter circuit connected to said gate means for providing a signal directly proportional to the product of said first and second analog voltages.

2. An analog voltage multiplier as set forth in claim 1 wherein said means for generating a run-down voltage comprises a phantastron.

3. An analog voltage multiplier comprising in combination:
   (a) means for generating a run-down voltage,
   (b) a first voltage comparator connected to said generating means,
   (c) a first analog voltage source connected to said comparator for generating a first pulse at the output of said comparator when said analog voltage equals said run-down voltage,
   (d) a second voltage comparator connected to said generating means,
   (e) a reference voltage source connected to said second comparator for generating a second pulse at the output of said second comparator when said reference voltage equals said run-down voltage,
   (f) means for applying said second pulse to said generating means for terminating said run-down voltage,
   (g) gate means connected to said first and second comparators whereby said first pulse opens said gate and said second pulse closes said gate,
   (h) a second analog voltage source connected to said gate, and
   (i) a filter circuit connected to said gate for providing a signal directly proportional to the product of said first and second analog voltages.

4. An analog voltage multiplier comprising in combination:
   (a) a phantastron circuit for generating a run-down voltage,
   (b) first and second voltage comparators connected to said phantastron for comparing said run-down voltage with a first analog voltage and a reference voltage,
   (c) a first analog voltage source connected to said first comparator,
   (d) means for adding an offset voltage to said first analog voltage, whereby the sum of said first analog voltage and said offset voltage is applied to said first comparator for generating a first pulse at the output of said first comparator when said sum equals said run-down voltages,
   (e) a reference voltage source connected to said second comparator for generating a second pulse at the output of said second comparator when said reference voltage equals said run-down voltage,
   (f) means responsive to said second comparator for terminating said run-down voltage,
   (g) a gating circuit connected to said first and second voltage comparator and adapted to be opened by said first pulse and to be closed by said second pulse,
   (h) a second analog voltage source connected to and controlled by said gate circuit,
   (i) a filter circuit connected to said gate circuit, and
   (j) means for sutracting said offset voltage from the output of said filter circuit whereby a signal directly proportional to the product of said first and second analog voltages is obtained.

References Cited by the Examiner

UNITED STATES PATENTS 2,773,641   12/1956   Baum _____ 235—194

MALCOLM A. MORRISON, *Primary Examiner.*

K. W. DOBYNS, J. RUGGIERO, *Assistant Examiners.*